US012800296B2

(12) United States Patent
Stambke et al.

(10) Patent No.: US 12,800,296 B2
(45) Date of Patent: Nov. 17, 2026

(54) METHOD FOR DISPLAYING AN OCT-SCANNED REGION OF A WORKPIECE SURFACE AND/OR FOR MEASURING SURFACE FEATURES, AND ASSOCIATED OCT SYSTEM

(71) Applicant: TRUMPF Laser GmbH, Schramberg (DE)

(72) Inventors: Martin Stambke, Dunningen (DE); Klemens Schmitt, Schramberg (DE)

(73) Assignee: TRUMPF Laser GmbH, Schramberg (DE)

( * ) Notice: Subject to any disclaimer, the term of this patent is extended or adjusted under 35 U.S.C. 154(b) by 480 days.

(21) Appl. No.: 17/633,278

(22) PCT Filed: Aug. 5, 2019

(86) PCT No.: PCT/EP2019/071011

§ 371 (c)(1),
(2) Date: Feb. 7, 2022

(87) PCT Pub. No.: WO2021/023368

PCT Pub. Date: Feb. 11, 2021

(65) Prior Publication Data

US 2022/0357150 A1 Nov. 10, 2022

(51) Int. Cl.

*G06T 12/00* (2026.01)
*G01B 9/02091* (2022.01)
*G01B 11/25* (2006.01)

(52) U.S. Cl.

CPC ...... *G01B 11/2518* (2013.01); *G01B 9/02091* (2013.01); *G06T 12/00* (2026.01)

(58) Field of Classification Search

CPC ......... G06T 7/0004; G06T 2207/30164; G06T 7/60; G06T 2200/04; G06T 2207/10024;
(Continued)

(56) References Cited

U.S. PATENT DOCUMENTS 4,907,169 A 3/1990 Lovoi
9,004,685 B2 4/2015 Iwase et al.
(Continued)

FOREIGN PATENT DOCUMENTS

CN 1751250 A * 3/2006 ............... G01V 5/22
CN 103584877 A * 2/2014
(Continued)

OTHER PUBLICATIONS

Wiesner Markus et al, "Optical coherence tomography for process control of laser micromachining", Review of Scientific Instruments, AIP, Melville, NY, US, Band 81, Nr. 3, Mar. 24, 2010 (Mar. 24, 2010), pp. 33705-33705, XP012134878.
(Continued)

*Primary Examiner* — Quan M Hua

(74) *Attorney, Agent, or Firm* — Laurence A. Greenberg; Werner H. Stemer; Ralph E. Locher

(57) ABSTRACT

An OCT system includes an optical coherence tomograph for recording a height profile of a workpiece surface by optical scanning of the workpiece surface. The OCT system includes a camera for recording an image of the workpiece surface and a display for the joint, in particular superimposed, display of the recorded image and the recorded height profile of the workpiece surface. A method for displaying an optically scanned region of a workpiece surface is also provided.

13 Claims, 2 Drawing Sheets

(58) Field of Classification Search
CPC . G06T 2207/10028; G06T 2207/30161; G06T 2207/30168; G06T 2207/30204; G06T 5/80; G06T 7/001; G06T 7/13; G06T 7/521; G06T 7/73; G06T 1/0007; G06T 15/10; G06T 17/20; G06T 19/006; G06T 2207/10004; H04N 13/239; H04N 13/257; H04N 1/60; H04N 9/3147; G06F 17/40; G06F 3/0412; G06F 18/2135; G06F 18/21355; G06F 18/22; Y10T 428/2457; G06V 10/7715; G06V 10/243; G06V 10/255; G06V 10/761; G06V 20/10; G06V 20/64; G06V 20/647; G06V 2201/06
See application file for complete search history.

(56) References Cited

U.S. PATENT DOCUMENTS

| | | | | |
|---|---|---|---|---|
| 2003/0019933 | A1* | 1/2003 | Tsikos | G06K 7/10 235/454 |
| 2008/0062429 | A1 | 3/2008 | Liang et al. | |
| 2008/0100612 | A1 | 5/2008 | Dastmalchi et al. | |
| 2010/0155375 | A1 | 6/2010 | Dietz et al. | |
| 2011/0282331 | A1 | 11/2011 | Brennan et al. | |
| 2013/0120740 | A1* | 5/2013 | Schonleber | G01B 9/02063 356/72 |
| 2013/0265543 | A1 | 10/2013 | Iwase et al. | |
| 2014/0119497 | A1* | 5/2014 | Guzman | G01N 33/241 250/255 |
| 2015/0042949 | A1 | 2/2015 | Jeglorz et al. | |
| 2015/0043003 | A1* | 2/2015 | Chung | G01B 9/02091 356/479 |
| 2015/0338210 | A1 | 11/2015 | Lessmüller et al. | |
| 2019/0011250 | A1 | 1/2019 | Kumar et al. | |
| 2019/0154595 | A1 | 5/2019 | Rempel et al. | |
| 2020/0299169 | A1* | 9/2020 | Cosneau | C03B 9/41 |
| 2021/0145273 | A1 | 5/2021 | Lubatschowski | |
| 2022/0007935 | A1* | 1/2022 | Minamide | A61B 5/4893 |
| 2022/0357150 | A1 | 11/2022 | Stambke et al. | |

FOREIGN PATENT DOCUMENTS

| | | | | |
|---|---|---|---|---|
| DE | 102014113283 | B4 | 11/2016 | |
| DE | 102017108193 | A1 | 10/2018 | |
| EP | 3102359 | B1 * | 5/2021 | B23K 26/032 |
| JP | 2012210293 | A | 11/2012 | |
| JP | 2013215243 | A | 10/2013 | |
| JP | 2017143201 | A | 8/2017 | |
| WO | 2021023368 | A1 | 2/2021 | |

OTHER PUBLICATIONS

Dorsch F et al, “Controlling laser processing via optical coherence topography”, SPIE—International Society for Optical Engineering. Proceedings, S P I E—International Society for Optical Engineering, US, Band 10911, Feb. 27, 2019 (Feb. 27, 2019), pp. 109110G-109110G, XP060117769.
High-Power Laser Materials Processing: Applications, Diagnostics, and Systems VIII Feb. 28, 2019.
Lu et al., The Principle and Clinical Application of Ocular Optical Coherence Tomography, 2008, p. 14-16, Shanghai Scientific and Technical Publishers, Shanghai, China, ISBN 978-7-5062-8187-4.

* cited by examiner

METHOD FOR DISPLAYING AN OCT-SCANNED REGION OF A WORKPIECE SURFACE AND/OR FOR MEASURING SURFACE FEATURES, AND ASSOCIATED OCT SYSTEM

FIELD AND BACKGROUND OF THE INVENTION

The present invention relates to a method for displaying an optically scanned region of a workpiece surface and/or for measuring surface features, and also to an OCT system suitable for carrying out this method.

Imaging methods using optical coherence tomography (OCT) are known in the prior art. Three-dimensional profile images of workpieces can be recorded by means of OCT, in particular using small-field scanners. This image recording, referred to as OCT scan, is carried out in various geometric shapes, in particular in a line (line scan), along the surface of the workpiece. In order to generate such a profile image with useful resolution and fields of view, it is necessary to carry out a comparatively large number of OCT scans with a high time expenditure of hundreds of milliseconds. The line scans have to be arranged over a large area. Furthermore, the correct positioning of the optical coherence tomograph for carrying out the OCT scans relative to the workpiece in the plane of the workpiece surface is often unknown at the beginning of the scanning process. Determining the positioning likewise requires a large number of OCT scans with high time expenditure. The profile images generated by the OCT scans are able to be assigned to a region of the workpiece often only with difficulty.

The article published by the present applicant "Controlling laser processing via optical coherence tomography" by F. Dorsch, W. Dubitzky, J.-P. Hermani, A. Hromadka, T. Hesse, T. Notheis, and M. Stambke, Proc. SPIE 10911, High-Power Laser Materials Processing: Applications, Diagnostics, and Systems VIII, 109110G (27 Feb. 2019), describes OCT scanning in the form of a 3D imaging technique based on low coherence interferometry. Coaxially with the processing laser beam, an OCT measurement beam is coupled into the processing optical unit and yields height information of the surface to be examined. Additional information is obtained if the OCT measurement beam is deflected by means of a small-field scanner secured to the processing optical unit. The article additionally describes a variety of applications for OCT process control, such as e.g. observing the welding depth during the welding process, high-precision seam guidance and real-time process visualization during remote laser welding, and localizing contact pins (hairpins) in three dimensions in order then to position the processing laser beam accordingly.

SUMMARY OF THE INVENTION

The object of the present invention is to specify a method for displaying an OCT-scanned region of a workpiece surface and/or for measuring surface features which is able to be carried out with a smaller number of OCT scans, less time expenditure and with faster determination of the positioning of the OCT scans. It is furthermore the object of the invention to specify an OCT system suitable for carrying out the method.

This object is achieved according to the invention by means of a method for displaying an optically scanned region of a workpiece surface comprising the following method steps:

recording an image of the workpiece surface, recording a height profile of the workpiece surface by optically scanning the workpiece surface by means of an optical coherence tomograph, and displaying the recorded image and the recorded height profile of the workpiece surface jointly, in particular in a superimposed manner.

On the two-dimensional image recorded, in particular by a camera operating in the optical range, features of the workpiece surface can be measured by conventional image processing programs. Reflected-light image processing is carried out in addition to the OCT scanning of a region of the workpiece surface. The OCT scan of the workpiece surface is displayed together with the selected image excerpt, in particular in a manner superimposed on one another. The three-dimensional profile image generated by the superimposition of the recorded image with the OCT scan can be interpreted comparatively simply. The OCT scan makes it possible to ascertain inter alia the position and/or orientation of a feature of the workpiece surface in the height direction, as measured from the workpiece surface. A direct insertion of the height profile into the recorded image allows a better understanding of the surface structure of the workpiece. OCT employs different wavelengths than a camera designed for the optical range, which enables an assignment of the information obtained from the image recording and from the OCT scan. By means of the OCT scanning method according to the invention, during the laser welding process it is possible inter alia to precisely localize pairs of pin electrodes at the surface of workpieces and to determine the height and distance thereof.

Particularly preferably, an image excerpt is selected within the displayed image of the workpiece surface, that region of the workpiece surface which is to be scanned by the optical coherence tomograph subsequently being restricted to said image excerpt. Reflected-light image processing of the region of the workpiece surface is carried out before the OCT scanning. On the basis of the image recording the user can decide whether an OCT scan ought to be carried out on a feature of the workpiece surface. The number of necessary OCT scans can thus be reduced. Image processing programs can be used to ascertain an offset point for the OCT scan and to define a scan region. An accurate positioning of the optical coherence tomograph relative to the workpiece, said positioning being calculated in particular by a program for image processing, can be carried out before the OCT scan. It is also conceivable to position the OCT beam outside the field of view of the camera, but nevertheless to ascertain its position from the camera image.

Preferably, the image excerpt is selected directly on the displayed image graphically, in particular by means of a mouse or by means of a pinch-zoom function. The graphical support enables a rapid and accurate indication of the region in which an OCT height measurement is intended to be carried out.

With further preference, the image is recorded coaxially with respect to a measuring arm of the optical coherence tomograph. This measure enables the data from the image recording and from the OCT scan to be combined comparatively simply.

In a further aspect, the invention also relates to a method for measuring surface features of a workpiece surface, comprising the following method steps:

recording an image of the workpiece surface, determining at least one surface feature to be measured on the basis of the recorded image, and recording a height profile of the workpiece surface by optically scanning the workpiece surface by means of an optical coherence tomograph at the position of the at least one surface feature determined, in order to measure the at least one surface feature determined.

According to the invention, one or more surface features to be measured are determined on the basis of the image of the workpiece surface, and an OCT scan is subsequently carried out at the position of the surface feature determined, in order thus to measure the surface feature in terms of height. In this case, the at least one surface feature to be measured can be determined in an automated manner by an image processing facility on the basis of the recorded image or manually, as described above, on the basis of the displayed image.

In a further aspect, the invention also relates to an OCT system comprising an optical coherence tomograph for recording a height profile of a workpiece surface by optically scanning the workpiece surface, comprising a camera for recording an image of the workpiece surface, and comprising a display for displaying the recorded image and the recorded height profile of the workpiece surface jointly, in particular in a superimposed manner, and/or comprising an image processing facility for determining at least one surface feature to be measured on the basis of the recorded image. The OCT system is preferably mounted on a laser processing optical unit, in particular on a laser scanner of a processing laser beam.

Preferably, the imaging system comprises a selection device for selecting an image excerpt within the displayed image and a controller, which restricts that region of the workpiece surface which is to be scanned by the optical coherence tomograph to the selected image excerpt.

A camera is fitted in the beam path of the processing optical unit and on the basis of its camera image it is possible to define an offset point and a region for the OCT scan by image processing. The user can then precisely define the region of interest to said user for the OCT height measurement graphically in the displayed camera image. Such an imaging system makes it possible to reduce the number of OCT scans necessary for creating a three-dimensional profile image of the workpiece surface. In particular, the camera is oriented toward the workpiece surface coaxially with respect to a measuring arm of the optical coherence tomograph.

Preferably, the selection device has an input means for graphically selecting an image excerpt within the displayed image, which enables a rapid and precise input of the image excerpt. The selection device can have as input means a mouse or, this being preferred, a touch-sensitive touchscreen of the display, on which touchscreen the desired image excerpt is selected. For exact inputting of the position, the mouse/touch inputs can also be made more precise by way of a numeric panel with/without increment.

Further advantages and advantageous configurations of the subject matter of the invention can be gathered from the description, the drawing and the claims. Likewise, the features mentioned above and those that will be explained further can be used in each case by themselves or as a plurality in any desired combinations. The embodiments shown and described should not be understood as an exhaustive enumeration, but rather are of exemplary character for outlining the invention.

DETAILED DESCRIPTION OF THE INVENTION

Figure 1:
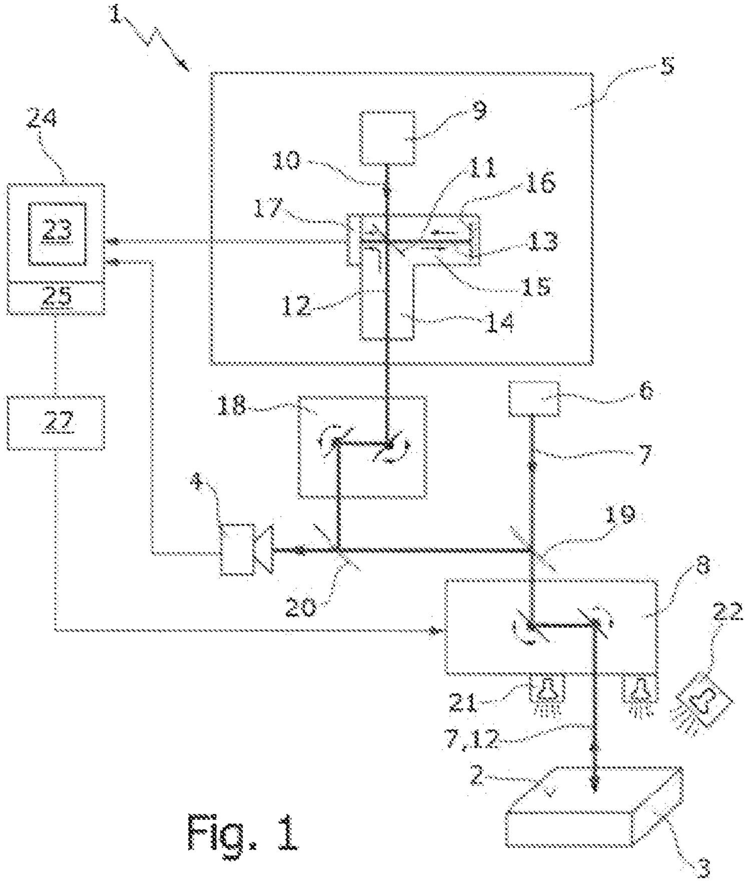
FIG. 1 shows a schematic illustration of the OCT system according to the invention.

The OCT system 1 shown schematically in FIG. 1 serves for optically scanning a region of the surface 2 of a workpiece 3 and comprises a camera 4 for recording an image of the workpiece surface 2, and an optical coherence tomograph 5 for optically scanning the workpiece surface 2. A laser source 6 generates a processing laser beam 7, which is directed onto the workpiece 3 by means of a laser scanner 8 in order to deflect the processing laser beam 7 on the workpiece surface 2 two-dimensionally or else three-dimensionally if the laser scanner 8 has a Z-axis.

The optical coherence tomograph 5 has in a known manner an OCT light source (e.g. super luminescence diode) 9 for generating an OCT beam 10, a beam splitter 11 for splitting the OCT beam 10 into a measurement beam 12 and a reference beam 13. The measurement beam 12 is forwarded to a measuring arm 14 and impinges on the workpiece surface 2, at which the measurement beam 12 is at least partly reflected and guided back to the beam splitter 11, which is nontransmissive or partly transmissive in this direction. The reference beam 13 is forwarded to a reference arm 15 and reflected by a mirror 16 at the end of the reference arm 15. The reflected reference beam is likewise guided back to the beam splitter 11. The superimposition of the two reflected beams is finally detected by a spatially resolving detector (OCT sensor) 17 in order, taking account of the length of the reference arm 15, to ascertain height information about the workpiece surface 2 and/or the current penetration depth of the processing laser beam 7 into the workpiece 3. This method is based on the fundamental principle of the interference of light waves and makes it possible to detect height differences along the measurement beam axis in the micrometers range. Adjacent to the measuring arm 14 there follows an OCT (small-field) scanner 18 in order to deflect the measurement beam 12 two-dimensionally on the workpiece surface 2 and thus to scan a region of the workpiece surface 2 with parallel line scanners, for example. By way of a mirror 19 arranged in the beam path of the processing laser beam 7, the measurement beam 12 is coupled into the laser scanner 8 in order to direct the measurement beam 12 onto the workpiece 3.

The camera 4 is preferably oriented coaxially with respect to the measurement beam 12 or with respect to the zero position of the non-deflected measurement beam 12 and thus looks at the workpiece 3 coaxially with the optical coherence tomograph 5 and the processing laser beam 7. The light coming from the workpiece surface 2 is fed to the camera 4 via a mirror 20 arranged in the beam path of the measurement beam 12, said mirror being transmissive in this direction. For the reflected-light illumination of the workpiece 3, a ring illumination facility 21 that is coaxial with respect to the optical axis or with respect to the axis of the zero position or an illumination facility 22 that is lateral in relation to the optical axis or the axis of the zero position is arranged, here merely by way of example at a laser scanner 8.

Figure 2:
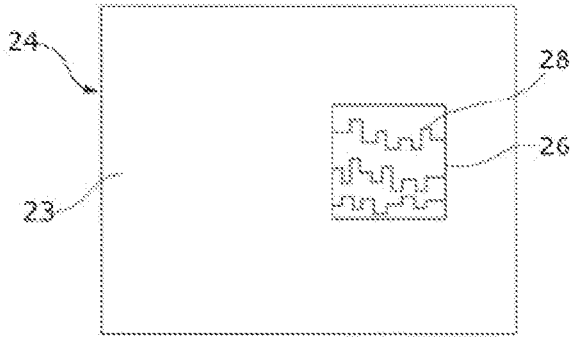
FIG. 2 shows a schematic illustration of a display of the OCT system with a selected image excerpt.

The camera image 23 recorded by the camera 4 with reflected light is displayed on a display 24 in the form of a screen. By way of a selection device 25 a user, as shown in FIG. 2, within the displayed camera image 23, can graphically select an image excerpt 26 of interest for the height measurement of the workpiece surface 2 and for this purpose mark the desired image excerpt 26 in the camera image 23. The selection device 25 can be embodied for example as a mouse or a touchscreen in order to select the image excerpt 26 directly on the displayed image 23 graphically—by means of a pinch-zoom function in the case of the touchscreen. For exact inputting of the position, the mouse/touch inputs can also be made more precise by way of a numeric panel with/without increment (position in X, Y and angle in comparison with the workpiece 3).

The selected image excerpt 26 can be graphically enlarged, reduced or displaced on the display 24. A controller 27 then restricts that region of the workpiece surface 2 which is to be scanned by the optical coherence tomograph 5 to this selected image excerpt 26. To put it more precisely, by means of (reflected-light) image processing on the basis of the selected image excerpt 26, the controller 27 ascertains the offset value for the OCT scanner 18, that is to say the displacement of the measurement beam 12 from its non-deflected zero position. The camera image 23 thus enables the more accurate positioning of the OCT scan, the geometry (one line, a plurality of lines or else other geometries) of which is programmed by the controller 27 on the basis of the selected image excerpt 26. The image processing positions the OCT scanner 18 such that the workpiece surface 2 can be measured in the height direction (z-direction) by means of a time-noncritical OCT scan. Integrating the OCT sensor 17 into the image processing of the controller 27 makes it possible to combine the advantages of the image processing with those of the OCT sensor 17.

On the display 24, the height profile 28 of the selected region 26 of the workpiece surface 2, said height profile being obtained by the OCT sensor 17, can be directly inserted into or superimposed on the selected image excerpt 26 of the camera image 23, which improves the optical evaluation of the workpiece surface 2 by the user.

Instead of the procedure as described above, only on the selected image excerpt 26, alternatively the height profile 28 can also be recorded in the entire region of the workpiece surface 2 recorded by the camera 4 and be displayed in a superimposed manner on the display 24. It is also conceivable to position the OCT beam 12 outside the field of view of the camera 4, but nevertheless to ascertain its position from the camera image 23.

Figure 3:
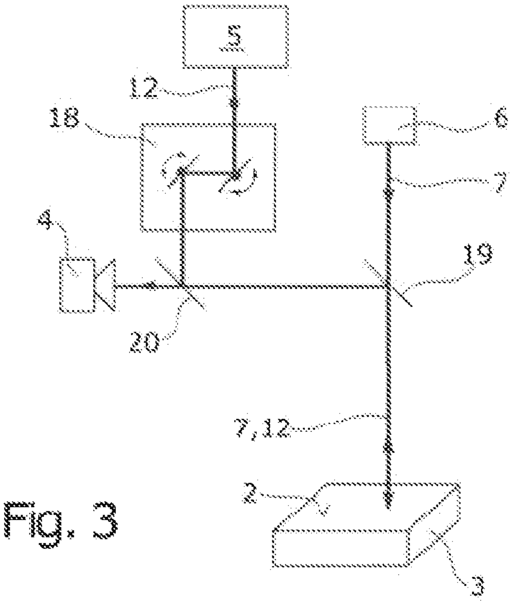
FIGS. 3 and 4 show two variants of the OCT system according to the invention.

The OCT system 1 shown in FIG. 3 differs from FIG. 1 merely in that here there is no laser scanner arranged in the beam path of the processing laser beam 7, that is to say that the processing optical unit is embodied as a fixed optical unit.

Figure 4:
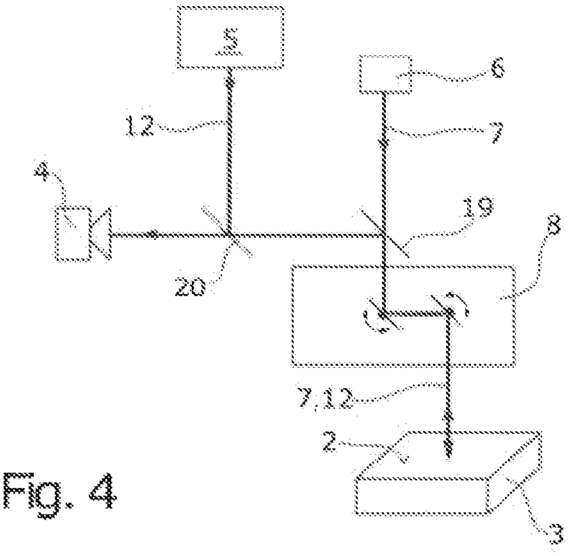

The OCT system 1 shown in FIG. 4 differs from FIG. 1 merely in that here there is no OCT (small-field) scanner arranged in the beam path of the measurement beam 12 and the laser scanner 8 performs the movement of the measurement beam 12 over the workpiece surface 2 in order to create the height profile 28.

The following procedure is adopted for measuring surface features of interest of a workpiece surface 2:

firstly, an image of the workpiece surface 2 is recorded by the camera 4, and one or more surface features to be measured are subsequently determined on the basis of the recorded camera image 23. This determination can be effected either in an automated manner by an image processing facility on the basis of the recorded camera image 23 or manually, as described above, on the basis of the displayed image 23. Afterward, a height profile 28 of the workpiece surface 2 is recorded by optically scanning the workpiece surface 2 by means of the optical coherence tomograph 5 at the position of the surface feature determined, in order thus to measure the determined surface feature in terms of height.

One application of the OCT scanning method according to the invention is, for example, the 3D localization of individual parts before they are laser-welded to one another.

In order to form stators in electric motors, it is known to provide a stator cage formed from an insulating material, so-called hairpins (pin electrodes) composed of an electrically conductive material, preferably copper, being introduced into said stator cage. The hairpins can be embodied for example in clip-shaped fashion or linearly and, after having been introduced into the stator cage, are present parallel to one another and substantially in the axial direction of the stator or of the electric motor in the stator cage. Around the periphery of the stator cage a multiplicity of such hairpins are introduced into the stator cage, said hairpins initially not being mechanically and electrically connected to one another during mounting or manufacture. After having been introduced into the stator cage and after possible reshaping and/or shortening and a possible pretreatment, for example stripping of any coatings, the respective free ends of the hairpins are then joined together preferably in pairs to form a complete stator winding, for example by welding. The joining process produces both a mechanical connection and an electrically conductive connection between the free ends of the respective pairs of hairpins, such that the hairpins initially present individually after having been introduced are now connected. The joining of the hairpins makes it possible to form a mechanically and electrically interconnected, continuous stator winding.

By means of the OCT scanning method according to the invention, during the laser welding process, pairs of hairpins to be welded can be precisely localized and the height and distance of the hairpins can be determined in order to orient the laser beam accordingly. Other geometric characteristics of interest, such as e.g. a gap or tilting between the hairpins to be welded, can also be measured in advance and then concomitantly taken into account, if appropriate, during laser welding. After welding, the imaging system can be used for quality assurance, e.g. for determining the weld bead of a laser-welded pair of hairpins.

The invention claimed is:

1. A method for displaying an optically scanned region of a workpiece surface, the method comprising:

recording an image of the workpiece surface;

limiting a region of the workpiece surface to be subsequently scanned by an optical coherence tomograph by selecting an image excerpt within the image of the workpiece surface, wherein the region of the workpiece surface which is to be subsequently scanned by the optical coherence tomograph is restricted to said image excerpt;

recording a height profile of the workpiece surface only in the selected image excerpt, by optically scanning only the selected image excerpt region of the workpiece surface using an optical coherence tomograph;

generating a height profile of the workpiece surface for display using only data recorded by the optical scanning of only the selected image excerpt region of the workpiece surface; and displaying the recorded image and the generated height profile of the workpiece surface for display jointly.

2. The method according to claim 1, which further comprises selecting the image excerpt graphically directly on the displayed image.

3. The method according to claim 2, which further comprises using at least one of a mouse, a pinch-zoom function or a position input to select the image excerpt graphically directly on the displayed image.

4. The method according to claim 1, which further comprises recording the image coaxially relative to a measuring arm of the optical coherence tomograph.

5. A method for measuring surface features of a workpiece surface, the method comprising:

recording an image of the workpiece surface;

determining at least one surface feature to be measured based on the recorded image;

selecting an image excerpt with the at least one surface feature to be measured within the displayed image of the workpiece surface, and subsequently restricting a region of the workpiece surface to be scanned by the optical coherence tomograph to the image excerpt;

recording a height profile of the workpiece surface only in the selected image excerpt, by optically scanning only the selected image excerpt region of the workpiece surface using an optical coherence tomograph at a position of the at least one determined surface feature, to measure the at least one determined surface feature; and generating a height profile of the workpiece surface using only data recorded by the optical scanning of only the selected image excerpt region of the workpiece surface.

6. The method according to claim 5, which further comprises automatically determining the at least one surface feature to be measured based on the recorded image.

7. The method according to claim 5, which further comprises the at least one surface feature to be measured is determined manually on the basis of the displayed image.

8. The method according to claim 5, which further comprises selecting the image excerpt graphically directly on the displayed image.

9. The method according to claim 8, which further comprises using at least one of a mouse, a pinch-zoom function or a position input to select the image excerpt graphically directly on the displayed image.

10. An OCT system, comprising:

an optical coherence tomograph for recording a height profile of a workpiece surface by optically scanning the workpiece surface;

a camera for recording an image of the workpiece surface;

a selection device for selecting an image excerpt within the displayed image;

a controller restricting a region of the workpiece surface to be scanned by said optical coherence tomograph to only the selected image excerpt and controlling the optical coherence tomograph to record a height profile of the workpiece surface only in the image excerpt, by optically scanning only the selected image excerpt region of the workpiece surface;

an image processor configured to generate a height profile of the workpiece surface for display using only data recorded by the optical scanning of only the selected image excerpt region of the workpiece surface; and a display for jointly displaying the recorded image and the recorded height profile of the workpiece surface in the image excerpt.

11. The OCT system according to claim 10, wherein said selection device has an input for graphically selecting the image excerpt within or outside of the displayed image.

12. The OCT system according to claim 11, wherein said input of said selection device is a touch-sensitive screen of said display on which the image excerpt is selected, or an input panel for manual position input.

13. The OCT system according to claim 10, wherein said camera is coaxially directed at the workpiece surface relative to a measuring arm of said optical coherence tomograph.

* * * * *